Patented Oct. 23, 1951

2,572,227

UNITED STATES PATENT OFFICE 2,572,227

ELASTOMERIC POLYSILOXANES AND METHODS OF PREPARING THEM, UTILIZING TERTIARY BUTYL PERACETATE

Earl Leathen Warrick, Pittsburgh, Pa., assignor to Dow Corning Corporation, Midland, Mich., a corporation of Michigan No Drawing. Application November 10, 1949, Serial No. 126,681

9 Claims. (Cl. 260—46.5)

1

This invention relates to elastomeric polysiloxanes and methods of preparing them.

Rubbery organopolysiloxanes have been prepared by vulcanizing polymeric organosiloxanes by heating them with certain organo peroxides. Of these, benzoyl peroxide and tertiary butyl perbenzoate have heretofore been the most satisfactory. The use of these two materials is disclosed in U. S. Patent No. 2,460,795 and in the applicant's copending application, Serial No. 651,383, filed March 1, 1946. Both benzoyl peroxide and tertiary butyl perbenzoate when employed to vulcanize certain organopolysiloxaes produce elastomeric materials which have found wide acceptance in the rubber industry. However, for certain uses it has been found that the compression set of such rubbers at 150° C. is unduly high. It is highly desirable therefore to provide a vulcanizing agent which gives organosiloxane rubbers having a compression set below the elastomers resulting from the use of the above peroxides.

The applicant has found that by employing tertiary butyl peracetate as a vulcanizing agent for siloxanes the compression set of the resulting elastomer is substantially below that of elastomers obtained by vulcanization with benzoyl peroxide or tertiary butyl perbenzoate.

In accordance with this invention a readily deformable organopolysiloxane having a viscosity of at least 5,000 cs. at 25° C. is compounded with from 1 to 10 percent by weight of tertiary butyl peracetate based upon the weight of the siloxane and if desired a filler and thereafter vulcanizing the mixture by heating it at a temperature of from 100° C. to 300° C. for at least 1 minute.

The polysiloxanes employed in this invention range in physical state from toluene soluble fluids of at least 5,000 cs. viscosity to toluene insoluble resilient gels. The particular type of polymer employed will depend upon the use for which the elastomer is to be put. For example, in coating applications it is often desirable to employ a low viscosity fluid of say 5,000 cs. to 200,000 cs. The fluid is mixed with the vulcanizing agent and with sufficient filler to form a paste of such a consistency that it may be easily spread upon the surface of the base member. The siloxane coat is then vulcanized in place.

For molded articles it may be desirable to employ nonflowing polymers. These may be either toluene soluble fluids having viscosities of say 2,000,000 cs. or above or toluene insoluble crosslinked gels. The compounding of the nonflowing siloxanes is best carried out by milling the polymer with the vulcanizing agent and filler. The

2 milled material may then be molded into the desired shape and vulcanized.

Vulcanization of the siloxanes of this invention is accomplished by heating the compounded materials at a temperature of between 100° C. and 300° C. for at least one minute. The vulcanization may be carried out either in a press or in contact with saturated steam. The methods are equally effective and the choice of method depends upon the manufacturing process employed.

After vulcanization the elastomers may be heated further in an oven at 200° C. to 250° C. Such an after cure improves the stress-strain properties of the elastomers.

The organopolysiloxanes employed herein may have a degree of substitution of from 1.95 to 2.05 organic groups per silicon atom. Preferably the degree of substitution should be essentially two organic radicals per silicon.

These organopolysiloxanes may be either homopolymeric dimethylsiloxanes or copolymers of dimethylsiloxane and siloxanes of the type RR'SiO where R is a monocyclic aryl radical and R' is methyl or monocyclic aryl. When the siloxane is a copolymer the monocyclic aryl siloxane should be present in an amount of 50 mol percent or less. In addition the polymers may contain up to 5 mol percent monoorgano siloxane and/or up to 5 mol percent triorgano siloxane in which siloxanes the organic groups are methyl and monocyclic aryl radicals or any combination thereof.

The above type polysiloxanes may be prepared by the hydrolysis of the corresponding chlorosilanes. The siloxane formed by such a hydrolysis may be advanced to the desired state of polymerization by any of the several methods known in the art for polymerization of siloxanes. These include for example alkaline polymerization as shown in the copending application of James F. Hyde, Serial No. 664,701, acid polymerization as shown in U. S. Patent No. 2,437,204 and salt polymerization as shown in U. S. Patents No. 2,453,092 and No. 2,449,572.

The vulcanizing agent employed in this invention is tertiary butyl peracetate. This material may be prepared by reacting tertiary butyl hydroperoxide with acetyl chloride in pyridine at a temperature of between 20° C. and 30° C. The reaction proceeds as follows:

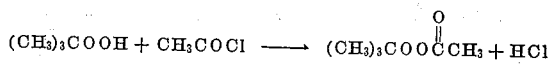

The pyridine combines with the hydrogen chloride to produce pyridine hydrochloride. The tertiary butyl peracetate is recovered from the reaction mixture by distilling at reduced pressure.

Fillers which may be employed in the elastomers of this invention include metallic oxides such as $TiO_2$, $ZnO$, $MgO$, $Fe_2O_3$ and $Cr_2O_3$ and non-metallic fillers such as diatomaceous earth, fume silica, and carbon black. The fillers are preferably employed in amount of from one part filler per 5 parts of siloxane to one part filler per ⅓ part siloxane.

The elastomers of this invention have less compression set than the elastomers obtained by vulcanizing siloxanes with benzoyl peroxide or tertiary butyl perbenzoate. The products of this invention possess such heat stability and oxidation resistance that they retain their flexibility permanently at temperatures ranging from —65° C. to +150° C. Hence, the instant materials are of great utility in high and low temperature applications for elastomeric materials.

The following examples are illustrative only.

Example 1

The tertiary butyl peracetate employed in this invention was prepared as follows: 600 g. of a mixture containing 60 percent by weight tertiary butyl hydroperoxide and 40 percent of ditertiary butyl peroxide was dissolved in 400 g. of pyridine. The solution was cooled to 0° C. and 325 g. of acetyl chloride were added as the mixture was held at a temperature between 20° C. and 30° C. During addition of the acetyl chloride, pyridine hydrochloride precipitated. The reaction product was washed with ice water, then with dilute sodium carbonate solution until slightly alkaline and again with water until neutral. The pyridine layer was dried in contact with anhydrous sodium sulphate and thereafter filtered. The ditertiary butyl peroxide was then removed by distilling at a temperature of 30° C. and a pressure of 50 mm. of mercury. The residue was tertiary butyl peracetate.

Example 2

100 parts by weight of a toluene insoluble gel which was prepared by polymerizing dimethylsiloxane with KOH was milled with 100 parts by weight of $TiO_2$ and two parts by weight tertiary butyl peracetate based upon the weight of the siloxane. The milled material was heated in a press at 150° C. for 5 minutes. The above procedure was repeated except that 4 percent, 6 percent and 8 percent tertiary butyl peracetate were employed respectively. After vulcanization the samples were each aged by heating at 200° C. for one week. The physical properties of the resulting elastomers are given in Table I below:

| Per Cent Tertiary Butyl Peracetate | Tensile and p. s. i. | Per Cent Elongation at Break | Shore |
|---|---|---|---|
| 2 | 168 | 268 | 37 |
| 4 | 123 | 207 | |
| 6 | 213 | 162 | 28 |
| 8 | 203 | 163 | 26 |

Example 3

Three samples of the dimethylsiloxane gel of Example 1 were each mixed with $TiO_2$ in the ratio of 100 parts gel to 100 parts filler. One of the three samples was then mixed with 2 percent by weight tertiary butyl peracetate, another with 2 percent by weight tertiary butyl perbenzoate and the third with two percent by weight benzoyl peroxide, all of the weights being based upon the weight of the siloxane. Each of the samples was vulcanized by heating in a press at 150° C. for 5 minutes. Each sample was then cured by heating at 200° C. for a total of one month. The compression set at 150° C. of the three samples as shown in Table II below.

| Vulcanizing Agent | Time at 200° C. | Compression Set at 150° C. |
|---|---|---|
| | | Per Cent |
| Benzoyl peroxide | 1 week | 26 |
| | 1 month | 16½ |
| Tertiary butyl perbenzoate | 1 week | 27½ |
| | 1 month | 9.5 |
| Tertiary butyl peracetate | 1 week | 14½ |
| | 1 month | 4 |

The compression set of the elastomers was determined in accordance with method B, ASTM test, D 395–46T.

Example 4

Elastomeric polysiloxanes are obtained when 100 parts of a benzene soluble copolymeric siloxane having a viscosity of 2,000,000 cs. and a composition of 90 mol percent dimethylsiloxane and 10 mol percent of any of the following siloxanes: phenylmethylsiloxane, diphenylsiloxane, chlorophenylmethylsiloxane, ditolylsiloxane or phenylchlorophenylsiloxane, is compounded with 100 parts of $TiO_2$ and 4 percent by weight tertiary butyl peracetate and thereafter vulcanized by heating the mixture at 150° C. for 5 minutes.

That which is claimed is:

1. A method of preparing elastomeric polysiloxanes which comprises compounding a readily deformable polymeric siloxane of at least 5,000 cs. viscosity at 25° C., which siloxane has a degree of substitution of from 1.95 to 2.05 organic groups per silicon atom, said organic groups being selected from the group consisting of methyl and monocyclicaryl radicals, there being at least 50 mol percent dimethylsiloxane in said polymeric siloxane, with a filler and from 1 to 10 percent of tertiary butyl peracetate based upon the weight of the siloxane and thereafter vulcanizing the compounded material by heating it at a temperature of from 100° C. to 300° C. for at least 1 minute.

2. A method of preparing elastomeric polysiloxanes which comprises heating a mixture of a readily deformable polymeric siloxane of at least 5,000 cs. viscosity at 25° C. which siloxane has a degree of substitution of from 1.95 to 2.05 organic groups per silicon atom, said organic groups being selected from the group consisting of methyl and monocyclic aryl radicals, there being at least 50 mol percent dimethylsiloxane in said polymeric siloxanes, a filler and from 1 to 10 percent tertiary butyl peracetate based upon the weight of the siloxane at a temperature of from 100° C. to 300° C. for at least 1 minute.

3. A composition of matter which is composed of a readily deformable organosiloxane of at least 5,000 cs. viscosity at 25° C. which siloxane has a degree of substitution of from 1.95 to 2.05 organic groups per silicon atom, said organic groups being selected from the group consisting of methyl and monocyclic aryl radicals, there being at least 50 mol percent dimethylsiloxane in said polymeric siloxane, and from 1 to 10 per cent tertiary butyl peracetate based upon the weight of the siloxane.

4. A composition of matter which is composed of a readily deformable organosiloxane of at least 5,000 cs. viscosity at 25° C. which siloxane has a degree of substitution of from 1.95 to 2.05 organic groups per silicon atom, said organic groups being selected from the group consisting of methyl and monocyclic aryl radicals, there being at least 50 mol percent dimethylsiloxane in said polymeric siloxane, a filler and from 1 to 10 percent tertiary butyl peracetate based upon the weight of the siloxane.

5. A composition of matter which is composed of a readily deformable polymeric organosiloxane of at least 5,000 cs. viscosity, said siloxane being composed of at least 50 mol per cent dimethylsiloxane, the remainder of the siloxane being composed of units of the formula RR′SiO where R is a monocyclic aryl radical and R′ is selected from the group consisting of methyl and monocyclic aryl radicals and from 1 to 10 percent tertiary butyl peracetate based upon the weight of the siloxane.

6. A composition of matter in accordance with claim 5 in which the siloxane is dimethylsiloxane.

7. A composition of matter in accordance with claim 5 in which the siloxane is a copolymer containing at least 50 percent dimethylsiloxane, the remainder being phenylmethylsiloxane.

8. A composition of matter in accordance with claim 5 wherein the siloxane is a copolymer containing dimethylsiloxane in amount of at least 50 mol percent, the remainder being diphenylsiloxane.

9. A composition of matter which is composed of a readily deformable polymeric organosiloxane of at least 5,000 cs. viscosity, said siloxane being composed of at least 50 mol per cent dimethylsiloxane, the remainder of the siloxane being composed of units of the formula RR′SiO where R is a monocyclic aryl radical and R′ is selected from the group consisting of methyl and monocyclic aryl radicals, a filler and from 1 to 10 percent tertiary butyl peracetate based upon the weight of the siloxane.

EARL LEATHEN WARRICK.

REFERENCES CITED

The following references are of record in the file of this patent:

UNITED STATES PATENTS

| Number | Name | Date |
| --- | --- | --- |
| 2,403,709 | Dickey et al. | July 9, 1946 |
| 2,448,530 | Jones | Sept. 7, 1948 |
| 2,484,595 | Sprung | Oct. 11, 1949 |